United States Patent
Schlitt

[11] 3,805,625
[45] Apr. 23, 1974

[54] ASYMMETRIC GYROSCOPE

[75] Inventor: Helmut W. Schlitt, Dover, Mass.
[73] Assignee: Northrop Corporation, Los Angeles, Calif.
[22] Filed: Feb. 21, 1973
[21] Appl. No.: 334,209

[52] U.S. Cl. .................................. 74/5.34, 74/5.4
[51] Int. Cl. ............................................. G01c 19/00
[58] Field of Search ............ 74/5 F, 5 R, 5.4, 5.6 A, 74/5.6 D, 5.34; 318/580, 648

[56] References Cited
UNITED STATES PATENTS
| | | | |
|---|---|---|---|
| 3,559,492 | 2/1971 | Erdley | 74/5 |
| 3,359,805 | 12/1967 | Schlitt | 74/5 |
| 3,382,726 | 5/1968 | Erdley | 74/5 X |

*Primary Examiner*—Manuel A. Antonakas
*Attorney, Agent, or Firm*—Kenway, Jenney & Hildreth

[57] ABSTRACT

In the gyroscopic apparatus disclosed herein, externally impressed rotation of the gyroscope spin axis is detected by means of the resultant oscillatory torque developed in an asymmetric rotor. The torque is developed at a frequency which is double the spin rate and the asymmetric rotor is resiliently mounted on a rotary carrier so as to be mechanically resonant at the double frequency, while undergoing spin. In order to minimize error torques or oscillations at the double frequency, e.g. as might be introduced by bearing imperfections, a symmetric rotor is resiliently mounted on the same carrier so as to have the same resonant frequency. Resonant oscillations of the symmetric rotor are detected or sensed and employed to drive a servo loop which dynamically torques the carrier so as to actively damp or minimize double frequency oscillations in both rotors, other than those induced in the asymmetric rotor by externally impressed angular displacements of the spin axis in space.

9 Claims, 4 Drawing Figures

ASYMMETRIC GYROSCOPE

BACKGROUND OF THE INVENTION

This invention relates to gyroscopic apparatus and more particularly to such apparatus employing an asymmetric rotor.

In conventional rotational gyroscopes, an externally impressed angular displacement of the spin axis around one transverse axis is detected by means of the resultant restoring torque required around the other transverse axis. As is understood, this is a steady state or continuous relationship and has been widely employed for measuring total angular displacement in so-called integrating gyros. Alternatively, this principle has been employed in maintaining a so-called stable platform which is maintained in a fixed attitude in space, even though the vehicle within which the platform functions changes its orientation. In these known prior art types of rotational gyros, the rotor is typically shaped as symmetrically as possible around the spin axis.

Since the relationship is steady state, any errors in the system, e.g. due to gimbal friction, tend to cause a residual drift which may be unpredictable in nature and therefore difficult to compensate.

In accordance with one aspect of the present invention, angular displacement or rotation of a gyroscopic spin axis in space is detected by means of an asymmetric rotor rather than the usual symmetric rotor. As will be understood by those skilled in the art, such a rotor will experience an oscillatory or pulsating torque as the spin axis is displaced, in addition to the usual steady state torque. The frequency of this oscillatory torque is twice the spin rate. The asymmetric rotor is mounted on a carrier so that the rotor is mechanically resonant at the double frequency around a transverse axis. With regard to this resonant rocking of the rotor, it should be understood that the resonant oscillation is at a frequency equal to twice the spin frequency when viewed from a stationary coordinate system but is at a frequency equal to the spin frequency when viewed with respect to a coordinate system rotating with the carrier. By mounting the asymmetric rotor in this fashion, the rotor can be rendered selectively responsive to oscillatory torques at the double frequency. Further, since the amplitude of oscillations tends to grow with a very long time constant in a high Q mechanical system, an effect analogous to integration in the d.c. or steady state domain may be accomplished. In order to limit the amplitude of the oscillations, however, a servo system is preferably employed which applies a balancing oscillatory torque causing the plane of rotation of the asymmetric rotor to closely follow the spin axis. The amplitude of the restoring torque required is then a measure of the rate of angular rotation of the spin axis in space. Since both the error signal and the output of the servo loop system are a.c. signals at double the spin frequency and since the servo loop is operating in conjunction with a resonant mechanical system of high Q, it can be seen that the system is inherently narrow-band in relation to the carrier and can be designed to discriminate to a substantial degree against most extraneous signals. In other words, most signals which could cause drift or inaccuracy will be at frequencies well outside the narrow passband of the servo system representing the torque to balance loop of the gyroscope.

There are, however, some sources of error which are not inherently eliminated by the basic system since they are synchronously related to the spinning of the gyro. For example, vibrations due to bearing noise and the operation of the drive motor may be at or rationally related to the resonant frequency, i.e. twice the spin frequency. Even though such noise may derive only from second order errors or imperfections in the bearing and drive system, it is desirable to eliminate this source of error since it must be understood that the sensing mechanism operates on the same frequency.

In accordance with another aspect of the invention, possible synchronous error signals are minimized by employing a servo system which utilizes a second but symmetric rotor, mounted on the same carrier as the asymmetric rotor. This symmetric rotor is likewise resiliently mounted so as to be mechanically resonant at twice the spin frequency. Since the symmetric rotor responds to extraneous torques or vibrations of twice the spin frequency in a manner essentially similar to the response of the asymmetric rotor, the symmetric rotor can be utilized as a signal source for dynamically suppressing or minimizing such vibrations. Since the symmetric rotor will not, however, experience oscillatory torques due to externally impressed angular displacement of the spin axis of a low frequency nature, this noise suppressing servo loop does not affect measurement of the desired signal.

Among the several objects of the present invention may be noted the provision of gyroscopic apparatus which is relatively accurate and relatively free of drift; the provision of such apparatus which will provide an indication of rate of rotation of its case or housing without requiring steady state integration; the provision of such apparatus which does not require the rotating system to be floated; the provision of such apparatus which does not require precision temperature stabilization; the provision of such apparatus which is of relatively simple and inexpensive construction. Other objects and features will be in part apparent and in part pointed out hereinafter.

SUMMARY OF THE INVENTION

Briefly, gyroscopic apparatus according to the present invention involves a carrier together with means for rotating the carrier around a first or spin axis at a frequency N. An asymmetric rotor is resiliently mounted on the carrier so as to be mechanically resonant at a frequency 2N when the carrier, together with the rotor, is being spun at rate N. A symmetric rotor is likewise resiliently mounted on the carrier so as to be mechanically resonant at frequency 2N, while being spun. The symmetric rotor is provided with means for sensing oscillation around either of a pair of orthogonal axes which are transverse to the spin axis. Torquer means are provided for applying, to the carrier, a torque around a selectable axis transverse to the spin axis. The 2N frequency sensing means and the torquer means acting on the carrier are employed in a servo loop which operates to dynamically minimize oscillations of the symmetric rotor at the 2N frequency, thereby also minimizing oscillations in the asymmetric rotor other than those induced by angular displacement of the spin axis in space. Accordingly, by sensing 2N oscillations of the asymmetric rotor, an indication is obtained of angular displacement of the spin axis.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
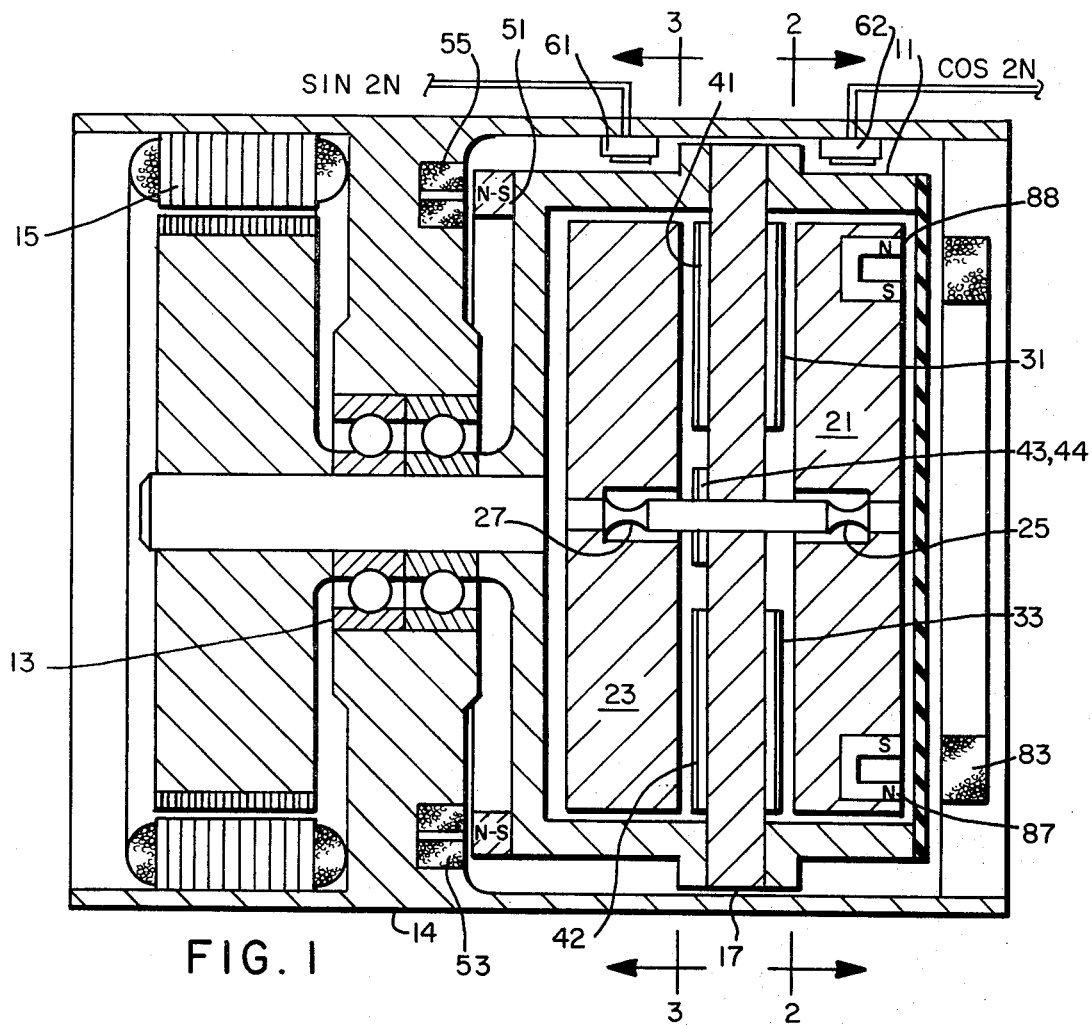
FIG. 1 is a side view, with parts broken away, of an illustrative embodiment of the present invention.
Figure 2:
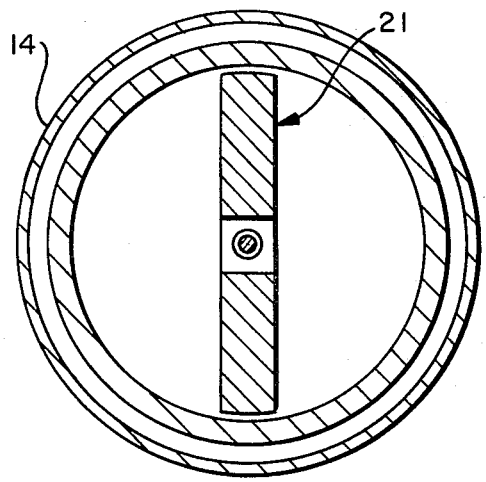
FIG. 2 is a sectional view taken substantially on the line 2—2 of FIG. 1.

In the illustrative embodiment shown in FIG. 1, the various components have been arranged so as to facilitate the description and explanation of the principles involved. However, as will be apparent to those skilled in the art, many other physical arrangements can be devised in accordance with the practice of the present invention and may afford certain advantages with respect to size and mechanically facilitating the assemblage of the elements. In FIG. 1, the entire carrier and rotor assembly is indicated generally at 11. This entire assembly is journaled as indicated at 13 within a housing 14 so that it can be rotated around a first axis, considered to be the principal or spin axis. Rotation at a preselected speed is provided by means of a suitable motor 15, e.g. a synchronous motor driven from a stable frequency source.

A carrier 17 is provided on which are mounted both an asymmetric rotor 21 and a symmetric rotor 23. Each rotor is resiliently mounted with respect to the carrier 17 by means of a respective spring, 25 and 27, so that it can rock around an axis which is transverse to the spin axis. The springs 25 and 27 are of a necked or beaver-cut configuration as illustrated and are so positioned with respect to the respective rotors so that the center of mass of each rotor coincides with the bending center of the respective spring. Accordingly, vibration of either rotor around an axis which is transverse to the spin axis will not appreciably affect the balance of overall rotor assembly 11. The moment of inertia of the asymmetric rotor 21 along its principal axis is selected in relation to the spring constant of spring 25 so that the asymmetric rotor is mechanically resonant at a frequency (2N) which is twice the spin rate (N). As will be understood by those skilled in the art, the total restoring force available to determine resonance will be affected by the rotation of the rotor 21 around the spin axis and thus the spring constant of the spring 25 must be determined so as to take this effect into consideration. A pair of capacitive proximity or position sensors 31 and 33 are provided adjacent the arms of the asymmetric rotor 21 for detecting rocking of the rotor around its transverse axis. Connected in a suitable bridge circuit, these sensors provide a signal representing the amplitude of any resonant oscillation of the rotor 21.

Figure 3:
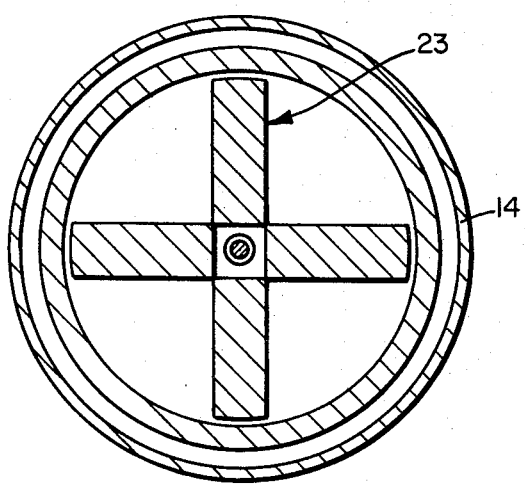
FIG. 3 is a sectional view taken substantially on the line 3—3 of FIG. 1.

The rate constant of the spring 27 is selected in relation to the moment of inertia of the symmetric rotor 23, around axes transverse to the spin axis, so that the symmetric rotor is also mechanically resonant at the same frequency (2N) as the asymmetric rotor, while the entire rotor assembly 11 is undergoing rotation at rate N. In the case of the rotor 23, which has four arms as shown in FIG. 3, the resonant vibration can occur around any transverse axis, the moment of inertia of the symmetric rotor being the same around any such axis.

A pair of position sensors, 41–42 and 43–44 respectively, are provided adjacent each pair of arms of the symmetric rotor for detecting or sensing any rocking of this rotor around either transverse axis, i.e. around the effective pivot point established by the spring 27. Each pair of sensors, connected in a suitable bridge circuit, thus provides an indication of any oscillation of the rotor 23 around the respective transverse axis, while the other pair of sensors provides an indication or signal of oscillation around the orthogonal transverse axis. As will be understood, these transverse axes are considered as rotating with the assembly 11.

A torque around a selectable transverse axis can be applied to the entire carrier assembly 11 by torquer means comprising a rotating annular magnet 51 adjacent the periphery of the carrier interacting with a pair of coils 53 and 55 mounted on the housing. The coils 53 and 55 are located so that they project fields linking the magnet 51 and are oppositely polarized. Thus, when the coils 53 and 55 are momentarily energized, e.g. by a unidirectional current pulse, one magnet will attract and the other will repel the coil. It can thus be seen that the coil and magnet structures together comprise a torque motor means capable of applying a torque to the carrier around an axis which is perpendicular to the spin axis, the actual angular orientation of the torque axis depending upon the phasing of the energization of the coils 53 and 55 with respect to the spinning of the rotor assembly. Thus, the direction of the torque vector can be controlled by varying the phasing of applied current pulses in relation to the spin of the gyroscopic apparatus.

Figure 4:
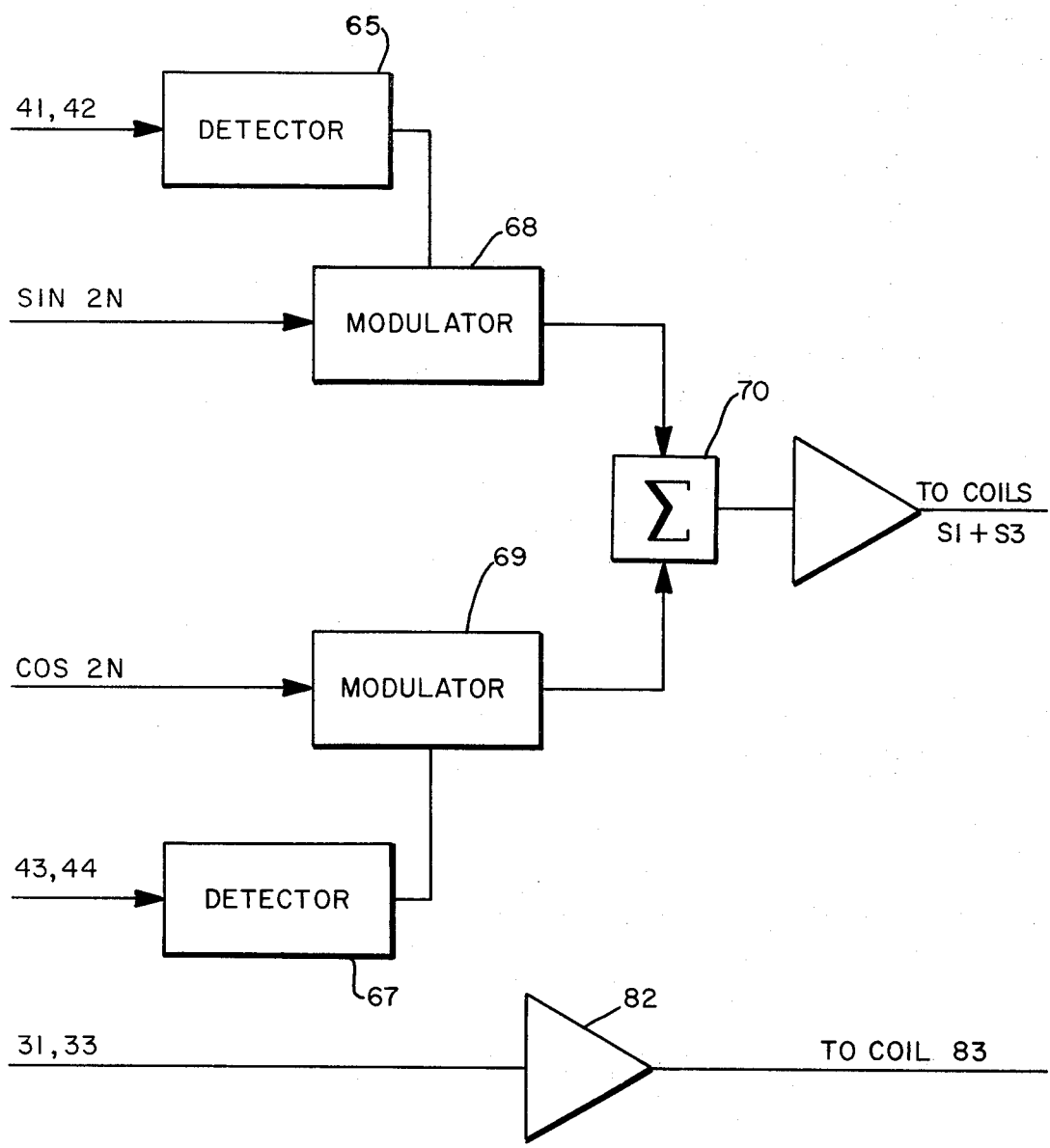
FIG. 4 is a schematic block diagram of servo loop electronic circuitry used with the apparatus of FIG. 1.

As illustrated in the block diagram of FIG. 4, the signals obtained from the sensors 41–44 are employed to control the energization of the coils 53 and 55 to obtain the dynamic 2N noise suppression mentioned previously. Optical pickoffs 61 and 62 cooperating with appropriate markings on the rotating carrier assembly 11 provide timing or phase reference signals which are at frequency 2N and are in quadrature with each other and which thereby define the instantaneous angular position of the rotor assembly about the spin axis. Signals obtained from these pickoffs are designated to be the sine 2N and cosine 2N reference signals respectively.

The a.c. signal of frequency N obtained from each pair of capacitive sensors is detected so as to obtain a signal representing the amplitude of mechanical oscillation around a respective transverse axis. The detectors are indicated at 65 and 67. Each amplitude signal is used to modulate a respective one of the 2N timing signals in a respective modulator 68 or 69 to obtain a respective feedback signal component having an amplitude which is proportional to the amplitude of oscillation around the respective transverse axis. The component feedback signals are combined as indicated at 70 and the combined signal is applied to the coils 53 and 55. Assuming that the sense of energization of the coils 53 and 55 is of the proper polarity, it will be seen that a negative feedback servo loop is formed which will tend to minimize or suppress oscillations of the symmetric rotor 23, including oscillations which may be produced or initiated by outside external noise sources such as the bearings 13. In one sense then the servo loop operates to dynamically provide a quiet or stable platform on which the two resonant rotor assemblies are mounted. As will also be understood by those skilled in the art, this stabilization occurs only in a narrow band around the frequency 2N so that the servo loop can operate stably at very high gain to provide a correspondingly high degree of suppression of these unwanted vibrational signals. As is understood in the servo art, lead-lag networks may be employed in conventional manner to obtain stable operation.

Since the rotor 23 is symmetric around the spin axis, changing the orientation of the spin axis in space will not induce oscillations at the frequency 2N, even though steady state torques will be required, as in conventional gyroscopes. Thus, the negative feedback servo loop driving the coils 53 and 55 will not interact with such vibratory signals. The asymmetric rotor 21, on the other hand, will experience oscillatory torques in response to any changing in orientation of the spin axis in space. Accordingly, the rotor 21 will oscillate at its resonant frequency in response to any such movement of spin axis and this oscillation is, in the practice of the present invention, applied as a measure of any angular displacement of the spin axis. As noted previously, such oscillations of the asymmetric rotor around an axis perpendicular to both the spin axis and the principal axis of the asymmetric rotor 21 are sensed by means of a pair of capacitive pickups 31 and 33. In order to limit the amplitude of these oscillations of the asymmetric rotor 21, the signal obtained from the pickups 31 and 33 is also employed to drive a negative feedback servo loop. The signal obtained from the sensors is amplified, as indicated at 82, and applied to an annular drive coil 83 which is mounted on the stationary housing and interacts with a pair of permanent magnet structures 87 and 88 mounted at respective ends of the asymmetric rotor 21. Suitable lead-lag compensating networks may again be employed in conventional manner. While the signal obtained from the pickups 31 and 33 is at frequency N, as described previously, so that the coil 83 is also energized at frequency N, the nature of the interaction between the magnets 87 and 88 and the coil 83 is such that a squaring effect is obtained, due to rotation of the rotor, thereby generating a proportional force component at frequency 2N viewed from a stationary coordinate system. This then is equal to the frequency of rocking oscillation of the asymmetric rotor, as seen from a fixed coordinate system.

Again, the operation of the servo loop is to suppress oscillations so that, when the loop is in operation, the rotor 21 is constrained to follow any movements of the spin axis in space. The output signal from the servo loop is, however, an indication of the rate at which the spin axis is being angularly displaced. The servo loop is again a narrow-band a.c. loop and thus relatively high gain can be employed. Since the axis of the impressed oscillation of the asymmetric rotor will depend upon the direction in which the spin axis is being displaced, the phasing of the feedback signal driving the coil 83 provides an identification of the transverse axis about which the spin axis is being displaced, while its amplitude is indicative of the rate of that rotation. If desired, this signal can be coherently resolved into its respective components by synchronously detecting the servo loop output signal using sine and cosine phase reference signals at frequency N.

As an alternative to obtaining a signal representing the angular displacement of the spin axis, the signal obtained from the sensors 81 and 82 can be used to control a servo loop which maintains a stable platform, the gyroscopic apparatus being mounted on the platform so that the spin axis in fact remains stationary in space. Since the signal obtained from the sensors 81 and 82 contains phase information as well as amplitude information, the single rotating gyroscopic assembly can control the orientation of the stable platform around a pair of orthogonal axes which are transverse to the spin axis. In other words, the apparatus of the present invention can effectively operate as a two-degrees-of-freedom gyroscope.

While magnetic torquing and feedback means have been shown by way of example, it should be understood that capacitive driving means may be employed as an alternative.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. Gyroscopic apparatus comprising:
   a carrier;
   means for rotating said carrier around a first axis at a frequency N;
   an asymmetric rotor resiliently mounted on said carrier, said rotor being mechanically resonant at a frequency 2N around an axis transverse to said first axis when said carrier, together with said rotor, is rotating at frequency N around said first axis;
   a symmetric rotor resiliently mounted on said carrier, said symmetric rotor being mechanically resonant at frequency 2N around any axis transverse of said first axis when said carrier, together with said symmetric rotor, is rotating at frequency N;
   means for sensing oscillation of said symmetric rotor around either of a pair of orthogonal axes;
   means for applying to said carrier a torque around a selectable axis which is transverse to said main axis;
   means forming, with said sensing means and said torquer means, a servo loop operating to minimize oscillations of said symmetric rotor at frequency 2N, thereby to also minimize 2N oscillations in said asymmetric rotor other than those induced by angular displacement of said first axis in space; and
   means for sensing oscillation of said asymmetric rotor around a transverse axis.

2. Apparatus as set forth in claim 1 wherein said asymmetric rotor is elongate and said symmetric rotor is generally in the form of a cross.

3. Apparatus as set forth in claim 2 wherein said means for sensing oscillation of said asymmetric rotor comprises a proximity sensor adjacent each end of the elongate rotor.

4. Apparatus as set forth in claim 2 wherein said means for sensing oscillation of said symmetric rotor comprises four proximity sensors, one adjacent each arm of said cross-shaped rotor.

5. Apparatus as set forth in claim 1 wherein said means for applying a torque to said carrier comprises a fixed annular coil interacting with magnets mounted on said carrier.

6. Apparatus as set forth in claim 1 wherein each of said rotors is mounted on a necked spring, the effective pivot point of each spring being essentially at the center of mass of the respective rotor.

7. Gyroscopic apparatus comprising:

a carrier;

means for rotating said carrier around a first axis;

an elongate asymmetric rotor resiliently mounted on said carrier, said rotor being mechanically resonant around an axis transverse to said first axis when said carrier, together with said rotor, is rotating around said first axis;

a symmetric rotor resiliently mounted on said carrier, said symmetric rotor being mechanically resonant at frequency 2N around any axis transverse of said main axis when said carrier, together with said symmetric rotor, is rotating at frequency N;

means for sensing oscillation of said symmetric rotor around either of a pair of orthogonal axes;

torquer means for applying to said carrier a torque around a selectable axis which is transverse to said main axis;

means forming, with said sensing means and said torquer means, a servo loop operating to minimize oscillations of said symmetric rotor, thereby to also minimize oscillations in said asymmetric rotor other than those induced by angular displacement of said first axis in space;

means for sensing oscillation of said asymmetric rotor around its transverse axis;

torquer means for applying a torque to said asymmetric rotor around its transverse axis; and means forming, with the second said sensing means and the second said torquer means, a servo loop minimizing oscillations of said asymmetric rotor induced by angular displacement of said first axis in space, the servo loop providing a signal proportional to the rate of displacement.

8. Apparatus as set forth in claim 7 wherein the second said torquer means comprised a fixed annular coil interacting with a pair of magnets carried adjacent the ends of said elongate asymmetric rotor.

9. Gyroscopic apparatus comprising:

a carrier;

means for rotating said carrier around a first axis at a frequency N;

an elongate asymmetric rotor resiliently mounted on said carrier, said rotor being mechanically resonant around an axis transverse to said first axis when said carrier, together with said rotor, is rotating around said first axis;

a symmetric rotor resiliently mounted on said carrier, said symmetric rotor being mechanically resonant at frequency 2N around any axis transverse of said main axis when said carrier, together with said symmetric rotor, is rotating at frequency N;

means for sensing oscillation of said symmetric rotor around a first transverse axis and providing a corresponding first a.c. signal;

means for sensing oscillation of said symmetric rotor around a second transverse axis and providing a corresponding second a.c. signal;

torquer means for applying to said carrier a torque around a selectable transverse axis which is transverse to said main axis;

means for detecting said first a.c. signal to obtain a first amplitude signal;

means for detecting said second a.c. signal to obtain a second amplitude signal;

means for generating from the rotation of said carrier a sine 2N reference signal and a cosine 2N reference signal;

means for modulating said sine 2N reference signal as a function of said first amplitude signal;

means for modulating said cosine 2N reference signal as a function of said second amplitude signal;

means for combining the modulated signals and energizing said torquer means in accordance with the sum, thereby to form a servo loop operating to minimize oscillations of said symmetric rotor, thereby to also minimize oscillations in said asymmetric rotor other than those induced by angular displacement of said first axis in space; and means for sensing oscillation of said asymmetric rotor around its transverse axis.

* * * * *